United States Patent
Natsumeda et al.

(10) Patent No.: US 11,675,641 B2
(45) Date of Patent: Jun. 13, 2023

(54) FAILURE PREDICTION

(71) Applicant: NEC Laboratories America, Inc., Princeton, NJ (US)

(72) Inventors: Masanao Natsumeda, Princeton Junction, NJ (US); Wei Cheng, Princeton Junction, NJ (US); Haifeng Chen, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 757 days.

(21) Appl. No.: 16/458,687

(22) Filed: Jul. 1, 2019

(65) Prior Publication Data

US 2020/0004616 A1 Jan. 2, 2020

Related U.S. Application Data

(60) Provisional application No. 62/693,111, filed on Jul. 2, 2018.

(51) Int. Cl.
*G06F 11/00* (2006.01)

(52) U.S. Cl.
CPC ................. *G06F 11/008* (2013.01)

(58) Field of Classification Search
CPC .............................. G06F 11/008; G06F 11/079
See application file for complete search history.

(56) References Cited

U.S. PATENT DOCUMENTS

| | | | |
|---|---|---|---|
| 8,804,267 B2 | 8/2014 | Huang et al. | |
| 9,244,803 B2 | 1/2016 | Adachi et al. | |
| 11,080,127 B1* | 8/2021 | Vincent | G06F 11/079 |
| 2012/0191633 A1 | 7/2012 | Liu et al. | |
| 2013/0013138 A1 | 1/2013 | Lu et al. | |
| 2014/0188777 A1* | 7/2014 | Yan | G06N 5/04 706/50 |
| 2015/0310349 A1 | 10/2015 | Li et al. | |

* cited by examiner

*Primary Examiner* — Joseph R Kudirka
(74) *Attorney, Agent, or Firm* — Joseph Kolodka (57) ABSTRACT

A failure prediction system is provided. The system includes a model-based signature generator generating feature vectors from individual attributes of multi-variate time series data based on sequence importance and attribute importance. The system further includes a knowledge database storing feature vectors corresponding to a set of different failure types. The system also includes a set of similarity detectors. Each detect any of the feature vectors generated by the model-based signature generator that are similar to any of the feature vectors corresponding to a respective one of the different failure types stored in the knowledge database based on a similarity threshold and output the respective one of the different failure types and a likely time period when the respective one of the different failure types will occur.

15 Claims, 10 Drawing Sheets

FAILURE PREDICTION

RELATED APPLICATION INFORMATION

This application claims priority to U.S. Provisional Pat. App. Pub No. 62/693,111, filed on Jul. 2, 2018, incorporated herein by reference herein its entirety.

BACKGROUND

Technical Field

The present invention relates to failure prediction and more particularly to a method and system for failure prediction.

Description of the Related Art

Failure prediction is the task of predicting the occurrence of predefined failures. Through the task, a category of the failure which will happen and its time frame can be provided. When it is accurately predicted, loss of the failure can be avoidable or minimized.

In general, those systems in the real world equip sensors in order to monitor its status and their readings are saved as multivariate time series in a database. In addition, there is an operation to record historical events, especially for failures. If the event is a failure, then the description in historical records includes its name and solution. If there is a description about the precursor of each failure in the time series, then a prediction model can be trained with the time series data and the description since a clear relationship between time series data and the precursor is given. Then the model predicts the failure finding the occurrence of the precursor. However, in many cases, there is no description about the precursor for each failure. This is the biggest problem to build a failure prediction model.

Accordingly, there is a need for an improved approach to failure prediction.

SUMMARY

According to an aspect of the present invention, a failure prediction system is provided. The system includes a model-based signature generator generating feature vectors from individual attributes of multi-variate time series data based on sequence importance and attribute importance. The system further includes a knowledge database storing feature vectors corresponding to a set of different failure types. The system also includes a set of similarity detectors. Each detect any of the feature vectors generated by the model-based signature generator that are similar to any of the feature vectors corresponding to a respective one of the different failure types stored in the knowledge database based on a similarity threshold and output the respective one of the different failure types and a likely time period when the respective one of the different failure types will occur.

According to another aspect of the present invention, a computer-implemented method is provided for failure prediction. The method includes generating, by a model-based signature generator, feature vectors from multi-variate time series data based on sequence importance and attribute importance. The method further includes storing, by a knowledge database, feature vectors corresponding to a set of different failure types. The method also includes detecting, by each of similarity detectors in a set, any of the feature vectors generated by the model-based signature generator that are similar to any of the feature vectors corresponding to the set of different failure types stored in the knowledge database based on a similarity threshold and outputting the respective one of the different failure types and a likely time period when the respective one of the different failure types will occur.

According to yet another aspect of the present invention, a computer program product is provided for failure prediction. The computer program product includes a non-transitory computer readable storage medium having program instructions embodied therewith. The program instructions are executable by a computer to cause the computer to perform a method. The method includes generating, by a model-based signature generator of the computer, feature vectors from multi-variate time series data based on sequence importance and attribute importance. The method further includes storing, by a knowledge database of the computer, feature vectors corresponding to a set of different failure types. The method also includes detecting, by each of similarity detectors of the computer, any of the feature vectors generated by the model-based signature generator that are similar to any of the feature vectors corresponding to the set of different failure types stored in the knowledge database based on a similarity threshold and outputting the respective one of the different failure types and a likely time period when the respective one of the different failure types will occur.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to failure prediction.

It is to be appreciated that the present invention is applicable to a myriad of systems and applications. Power plants, Information Technology (IT) system, automobiles and so forth are examples of such systems and applications.

Figure 1:
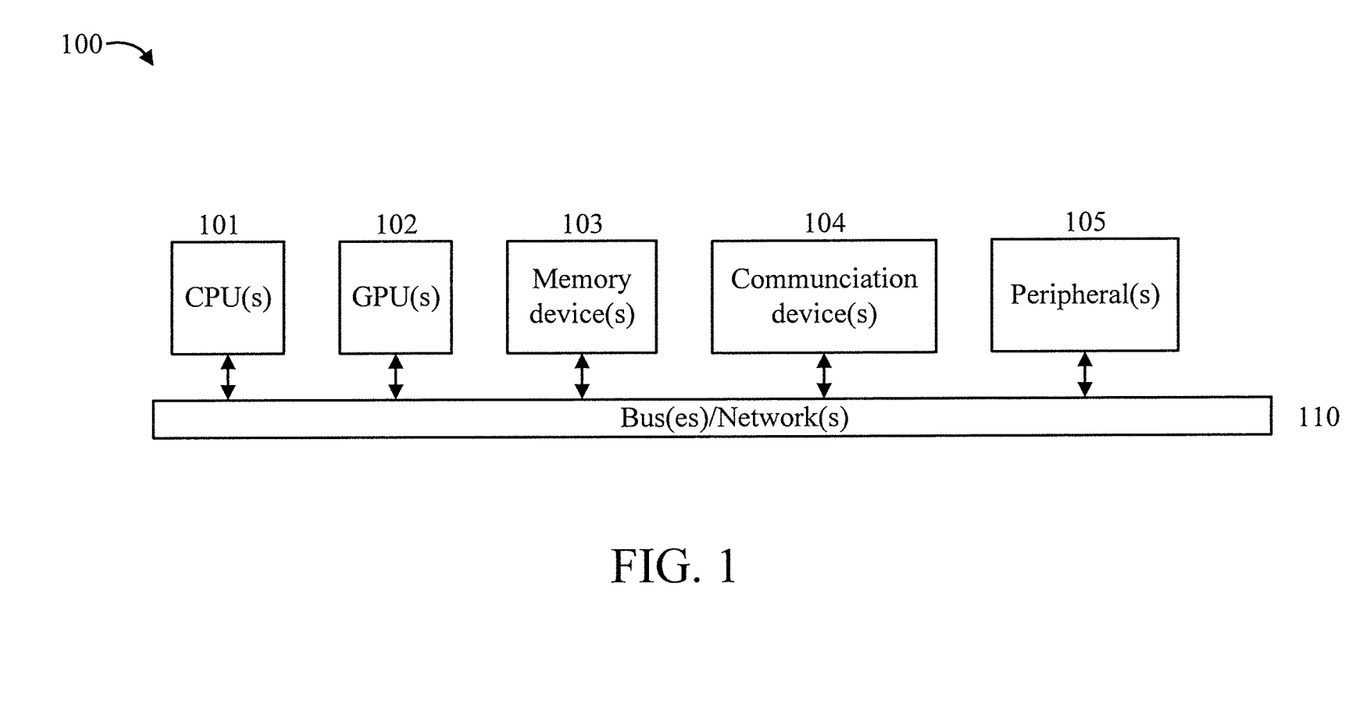
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processing system into a special purpose computer configured to implement various aspects of the present invention. In an embodiment, special purpose hardware (e.g., Application Specific Integrated Circuits, and so forth) can be used to implement various aspects of the present invention. For example, in an embodiment, the memory devices, along with one of the processors, can be specially programmed to implement a signature generator, detectors, a knowledge database, prediction model, and alarm generator as described herein.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
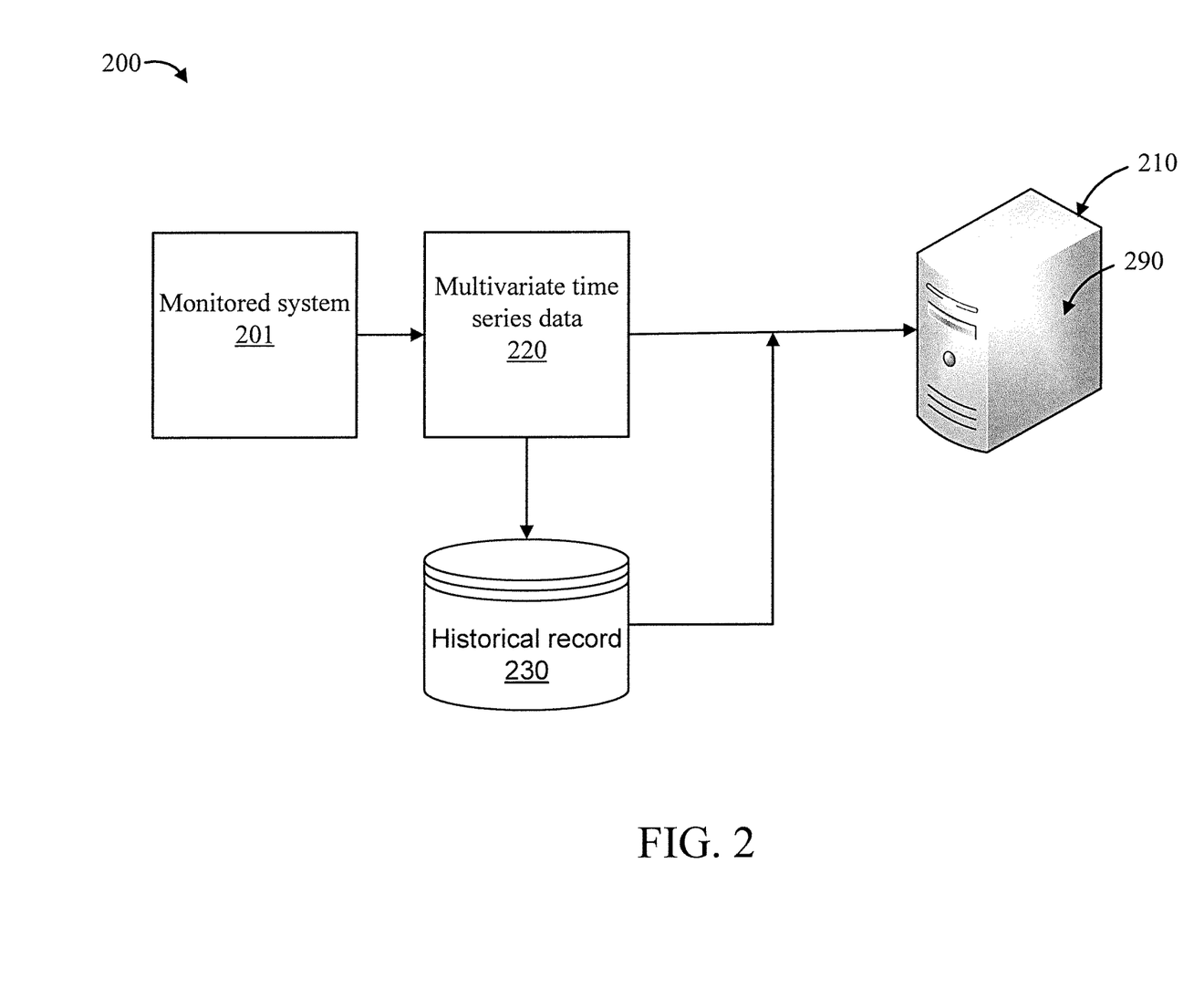
FIG. 2 is a block diagram showing an exemplary scenario for training a prediction model, in accordance with an embodiment of the present invention.
Figure 3:
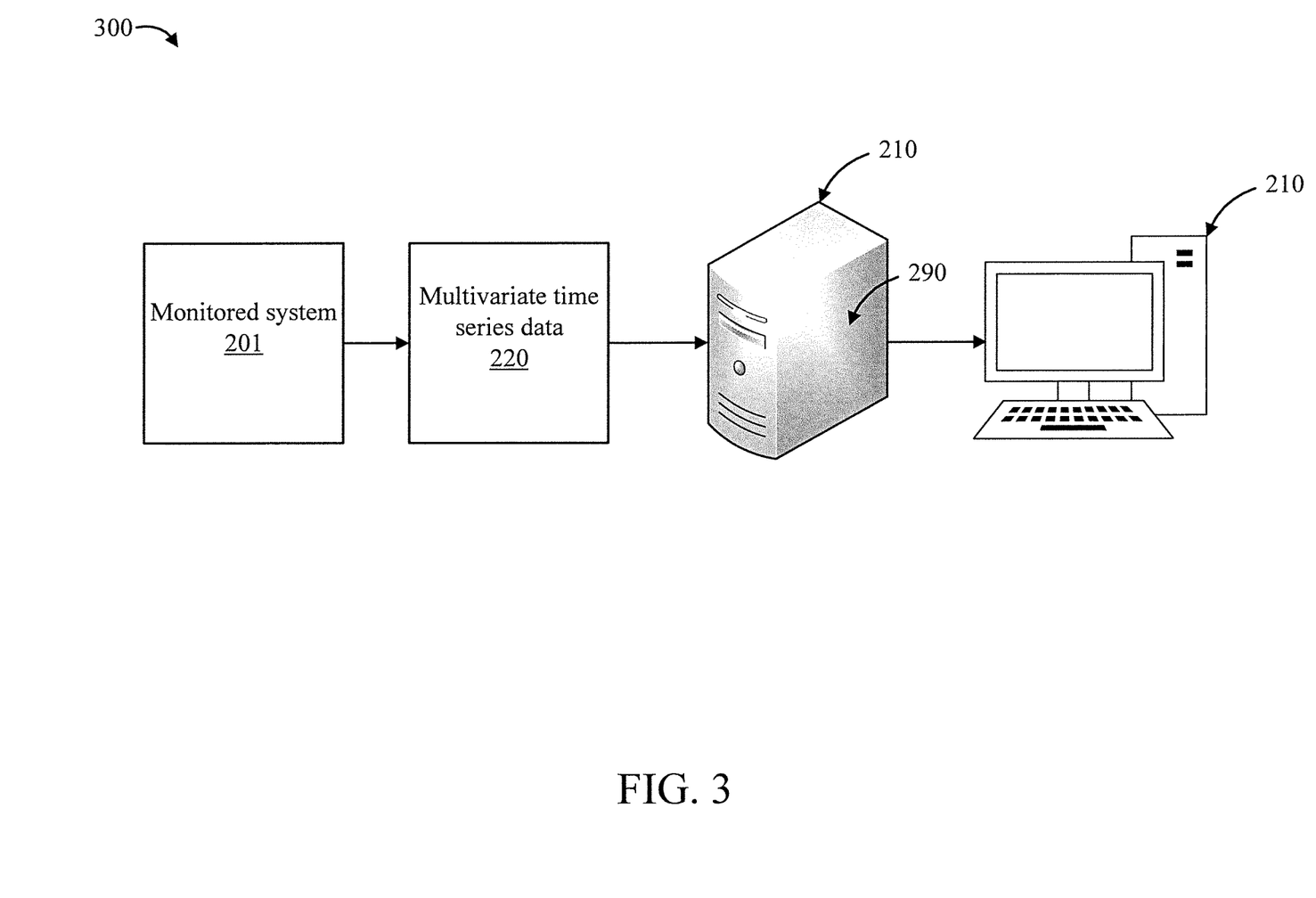
FIG. 3 is a block diagram showing an exemplary scenario for predicting a failure, in accordance with an embodiment of the present invention.

FIG. 2 is a block diagram showing an exemplary scenario 200 for training a prediction model, in accordance with an embodiment of the present invention. FIG. 3 is a block diagram showing an exemplary scenario 300 for predicting a failure, in accordance with an embodiment of the present invention. A prediction model is involved in the scenarios 200 and 300. For the sakes of simplicity and illustration, the prediction model described relative to FIGS. 2 and 3 predicts one type of failures. However, it is to be appreciated that the present invention is not so limited, and can be applied to models that predict multiple types of failures.

Referring to FIG. 2, initially, a prediction model 290 is built by a server 210 given multivariate time series data 220 and a historical record 230 for a monitored system 201. In an embodiment, the prediction model is stored in the server 210. The historical record 230 includes information about failures. The information about failures can include, but is not limited to, a failure category, a time the failure was noticed or happened, and a time the failure was resolved.

Referring to FIG. 3, once the prediction model 290 is trained, the prediction model 290 is used to compute the score for the prediction in real time given the latest segment of time series data. If the score is higher than a threshold, then the server 210 notifies its user through the client 240 that occurrence of the failure is predicted. In an embodiment, the present invention solves the problem of labeling failures in the historical record 230. It is to be appreciated that the present invention is beneficial for prediction accuracy and also for the workload labeling process since the present invention does not require precisely defining the segment which has the precursor.

Figure 4:
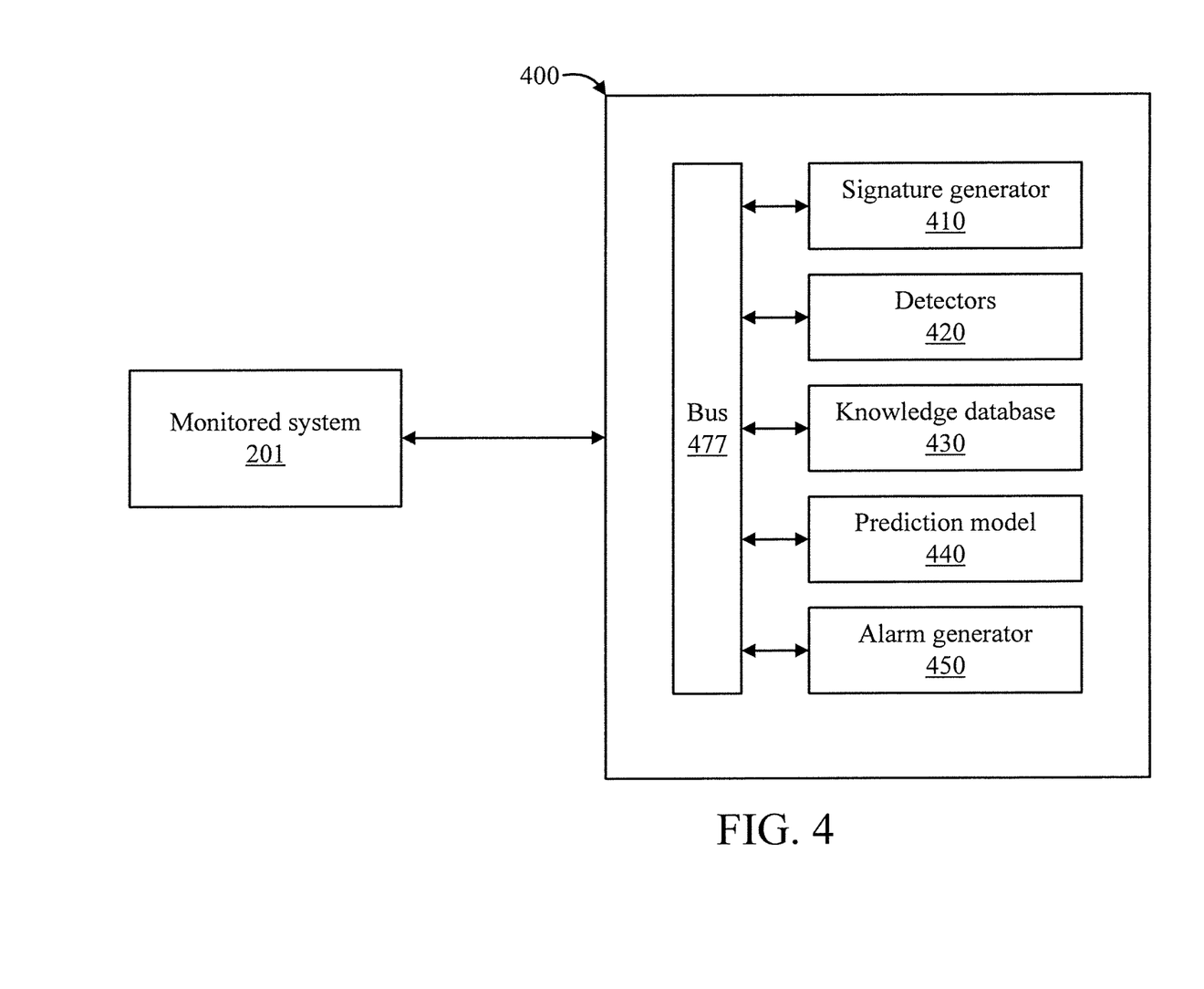
FIG. 4 is a block diagram showing an exemplary failure prediction system, in accordance with an embodiment of the present invention.

FIG. 4 is a block diagram showing an exemplary failure prediction system 400, in accordance with an embodiment of the present invention.

The failure prediction system 400 includes a signature generator 410, detectors 420, and a knowledge database 430, interconnected by bus 477 or other means as readily appreciate by one of ordinary skill in the art. The signature generator 410 is based on machine learning. The signature generator 410 builds a prediction model 440 from multi-variate time series referring history of failures during the period of the time series to give enough margins among sets of multi-variate time series which correspond to different kind of events such as normal, abnormal 1, abnormal 2, and so forth. Using the model 440, the signature generator 410 converts multi-variate time series into a feature vector. The role of detectors 420 is to detect similar feature vectors with that from a corresponding failure. That is why, in an embodiment, the number of the detectors 420 is the same with the number of categories of the failures which the signature generator 410 learns. Given a feature vector from incoming multi-variate time series, each detector 420 computes a similarity. When a failure happens multiple times, feature vectors for the failure exist with the same number of its occurrences. In this case, the similarity may be a maximum value of similarities between one of the feature vectors and an incoming feature vector. When the similarity exceeds pre-determined threshold, an alarm is generated by an alarm generator 450 with the likely period which the corresponding failure will happen within. The likely period is given with empirical evidence. The empirical evidence is stored in the knowledge database 430 and it was constructed from the training data of the signature generator 410. Using the training data, the time length between the corresponding time of the learned feature vector of a failure and the time the failure is noticed is given. Using a set of the time length for a failure, the likely period is determined. The likely period may start with the minimum of the time length and end with the maximum of the time length.

Figure 5:
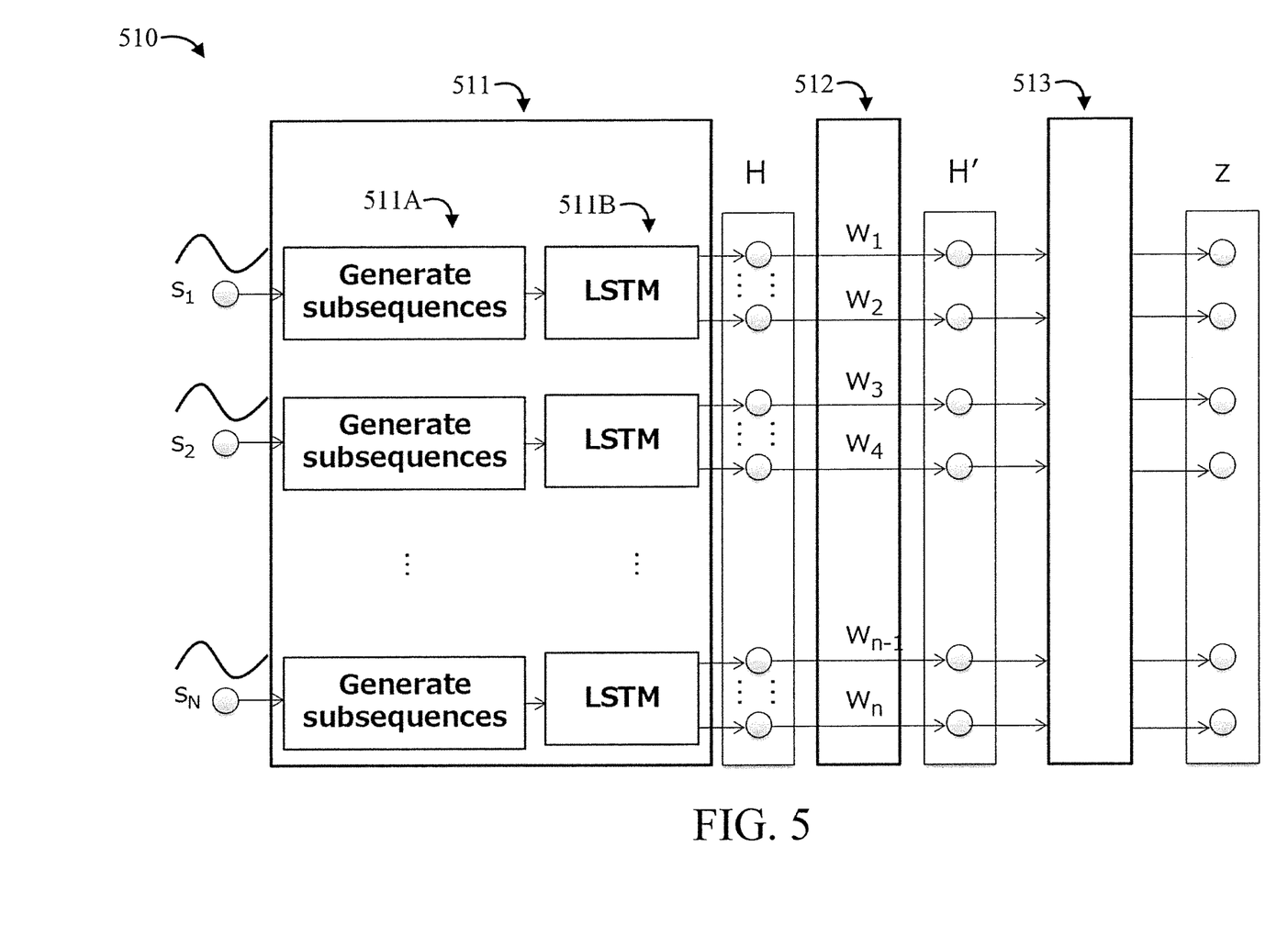
FIG. 5 is a block diagram showing an exemplary signature generator, in accordance with an embodiment of the present invention.

The signature generator 510 provides high interpretability of the results since it is based on the importance of the subsequences as well as the importance of the attributes of the subsequences. It is to be appreciated that the output from the feature converter 513 is not affected by the order of the inputted feature vectors. Once a detector detects a similar pattern of early symptoms, the detector provides a failure category type and a likely time period when the failure will occur.

FIG. 5 is a block diagram showing an exemplary signature generator 510, in accordance with an embodiment of the present invention. In an embodiment, signature generator 510 can correspond to signature generator 410 of FIG. 4.

The signature generator 510 includes a feature extractor 511, a feature selector 512 and a feature converter 513. The feature extractor 511 includes subsequence generators 511A and Long Short-Term Memory (LSTM) models 511B. The feature extractor 511 generates subsequences of given multi-variate time series with sliding window and then convert each of the subsequences into a feature vector. The feature extractor 511 can include LSTM models to convert a subsequence of multi-variate time series into a feature vector. Since the feature extractor 511 gives a feature vector $h_t$, the output from feature extractor 511 may be a matrix $H=[h_1, h_2 \ldots h_t \ldots h_T]$. Each LSTM model 511B is built for each individual attributes. The outputs from the LSTM models 511B are jointed to be a feature vector. The feature selector 512 gives weight $w_i$ for each element i in the feature vector and then outputs $H'=[h'_1, h'_2 \ldots h'_t \ldots h'_T]$. The feature converter 513 converts multiple feature vectors H' into a new feature vector z. The output from the feature converter 513 is not affected by the order of the inputted feature vectors. The following equation satisfies this property:

$$z = \Sigma_t a_t h_t, \therefore a_t = f(h_t) \quad (1)$$

The function f may be that in the following equation:

$$a_t = \text{softmax}(c^T \tanh(V h_t^T) | \text{sigm}(U h_t^T)) \quad (2)$$

In the preceding equations, ⊙ denotes an element-wise product, sigm denotes a sigmoid function, c denotes a weight vector, and U and V denote weight matrices.

To train the model in the signature generator 510, it may minimize triplet loss as follows:

$$f = \text{argmin } \Sigma_{i,j} \max\{d(a_i, p_j) - d(a_i, n_j) + m, 0\} \quad (3)$$

In the preceding, $d(a_i, p_j)$ denotes a distance between the $i^{th}$ anchor and $i^{th}$ positive sample, $d(a_i, n_j)$ denotes for a distance between $i^{th}$ anchor and $i^{th}$ negative sample, and m denotes the margin. The anchors represent samples from classes to be classified. Hence, to obtain an anchor given samples of a class, one of the samples is selected as an anchor, and the rest of the samples can be positive samples. In failure prediction, the anchors belong to classes of failures. Each of the anchors, positive and negative samples is a vector. In this case, those are z, output from the feature converter 513. The d function may compute the Euclidean distance between two vectors. Through its minimization, the feature extractor 511, feature selector 512 and feature converter 513 are jointly trained.

Figure 6:
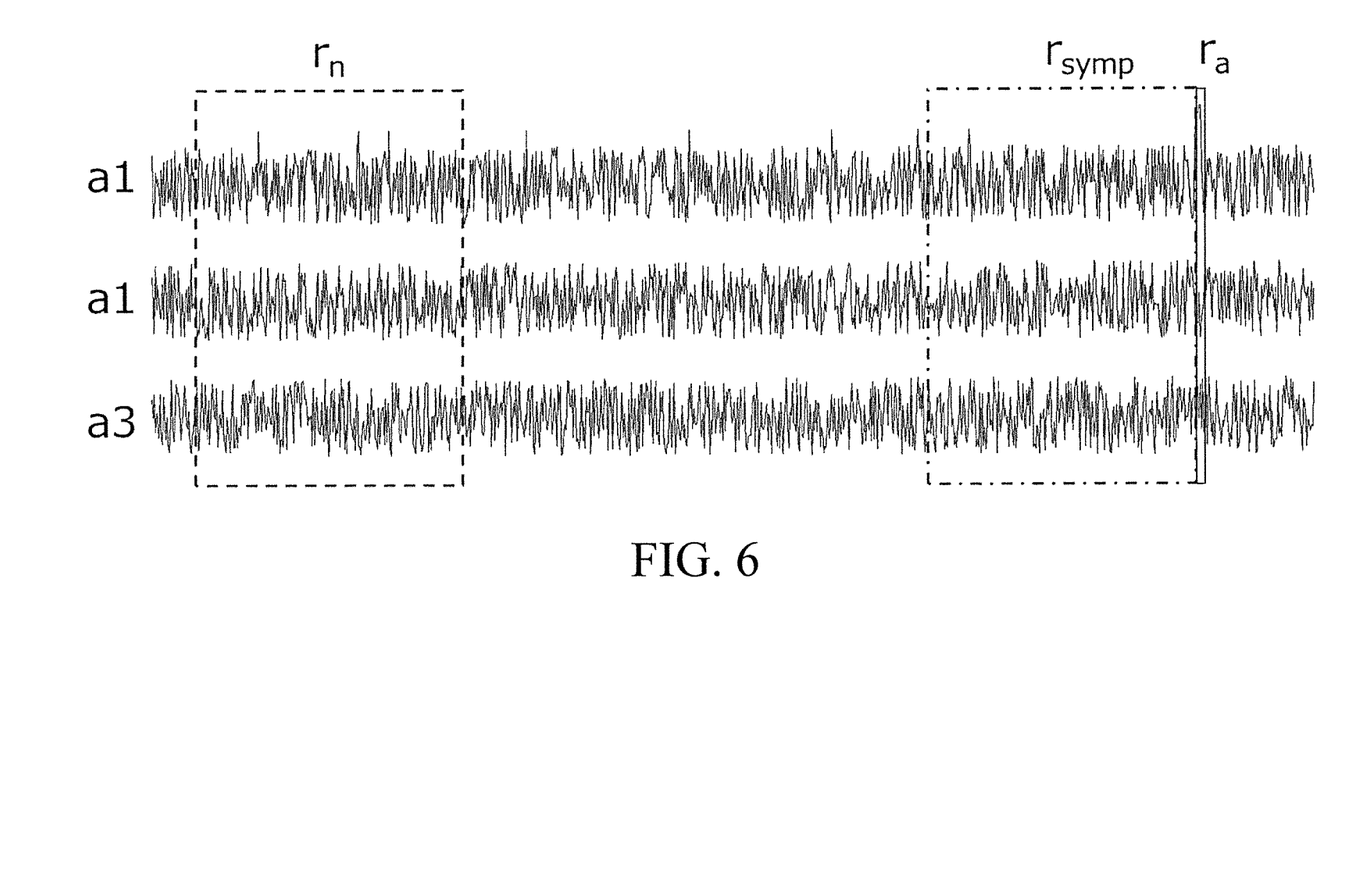
FIG. 6 is a diagram showing various exemplary multi-variate time series $s_1$-$s_3$, in accordance with an embodiment of the present invention.

The training data includes at least one early symptom region for each kind of failure and at least one normal region. Given one multi-variate time series with history of a failure, three different regions are defined as shown in FIG. 6 overlaid on multi-variate time series. That is, FIG. 6 is a diagram showing various exemplary multi-variate time series $s_1$-$s_3$, in accordance with an embodiment of the present invention. They are a normal region $r_n$, an early symptom region $r_{symp}$ and an abnormal region $r_a$. The normal region $r_n$ must not include any failures and may be far away from the abnormal region $r_a$. The early symptom region $r_{symp}$ is the likely region which includes the symptom and may be a period just before the failure. Early symptom regions can be given as regions with a fixed-width occurring just before abnormal regions. The width can be given as a parameter for training the models. Positive samples are time series during the early symptom region. Negative samples include time series during the normal region. Upon selecting an anchor, negative samples can include time series during the early symptom region of the remaining classes and may that include time series during the abnormal region of the remaining classes. Given the history of failures, one early symptom region is defined for each occurrence of a failure. The simplest case is as follows: the length of the early symptom region $r_{symp}$ is the same among different samples. In a typical use case, the length of the normal region $r_n$ is longer than the early symptom region $r_{symp}$. If that is the case, then multiple multi-variate subsequences are given from multi-variate time series of the normal region $r_n$. Those multiple multi-variate subsequences and the subsequence of the early symptom region $r_{symp}$ are the inputs to the signature generator 510. Each of them is converted into z, and then fed to the equation in Equation (3) as the samples. At least one anchor may be selected for each category excluding normal period data. For each anchor, samples which belong to the same category of the anchor become positive samples and the others become negative samples. When the length of $r_{symp}$ is vary for each samples, the maximum length may be determined in advance of training. Moreover, the part in the feature extractor 512 which generates subsequences duplicates several subsequences such that the number of vector $h_t$ in H is constant.

Figure 7:
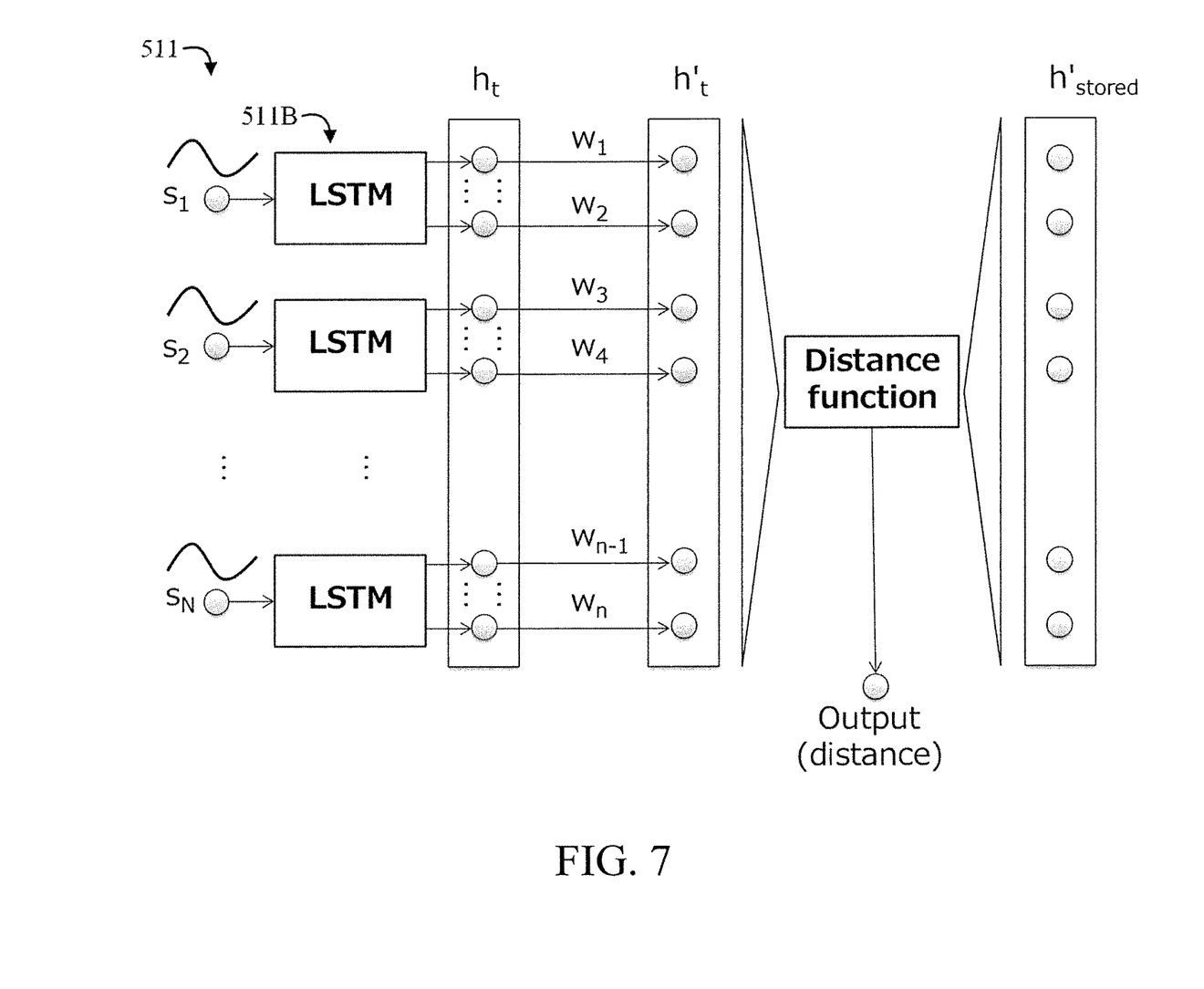
FIG. 7 is a block diagram showing the sequence to compute distance between a given segment and stored feature vectors, in accordance with an embodiment of the present invention.

FIG. 7 is a block diagram showing the sequence to compute distance between a given segment and stored feature vectors, in accordance with an embodiment of the present invention.

After parameters in the model are fixed, $a_t$ is computed for all multi-variate subsequences which is obtained with the same window size for LSTMs at training of the parameters. From the variance of $a_t$ in normal periods, the trivial range of $a_t$ is determined. For each early symptom region $r_{symp}$, the most significant $a_t$ which is significant value and the earliest on the corresponding time is determined and its corresponding feature vector $h'_t$ is stored as $h'_{stored}$ stored in the corresponding detector 420. The detector shares a part of components of the signature generator 510 in order to compute $h'_t$. The threshold of the detector 420 can be defined based on distribution on the distances from normal periods. The threshold may be the minimum of the distances. The threshold may be determined with some statistical methods such as m % quantiles of the distances. Here m is a small real number. The threshold of the detector 420 can be a prefixed constant value. The threshold may be the value of the margin in equation (3). Some margin may be added to the threshold. After the training, the detectors keep monitoring the target system.

The time difference between the corresponding time of the detection and that of the beginning of its $r_a$ is stored in the knowledge database as an empirical evidence for each category of failure. This distribution may be displayed to users. If subsequences are duplicated in training, $a_t$ should be summed for every duplicated one before the most significant is explored.

A description will now be given regarding various aspects and variations of the present invention, in accordance with one or more embodiments of the present invention.

The number of LSTM models 511B in the feature extractor 511 may be fewer than that of attributes. For example, we may apply the same LSTM model 511B over all attributes and iterate that until all LSTM models 511B are applied and then feature vectors from multiple LSTM are jointed. The jointed feature vector is used as the feature vector from the feature extractor 511.

If multiple feature time series are generated from a time series, each LSTM model 511B may be built for each original attribute of the time series and the multiple feature time series is input to the LSTM model 511B. Those multiple feature time series may be generated with some signal processing. Given a window size and applied sliding window strategy, it may generate time series of mean, variance, median, 5% quantile, 95% quantile, power spectral density within certain range of frequencies and coefficient of some parametric model for individual attributes such as Autoregressive coefficient, for example.

The feature selector 512 may give weight for input to the feature extractor 511 instead of output from the feature extractor 511.

Figure 8:
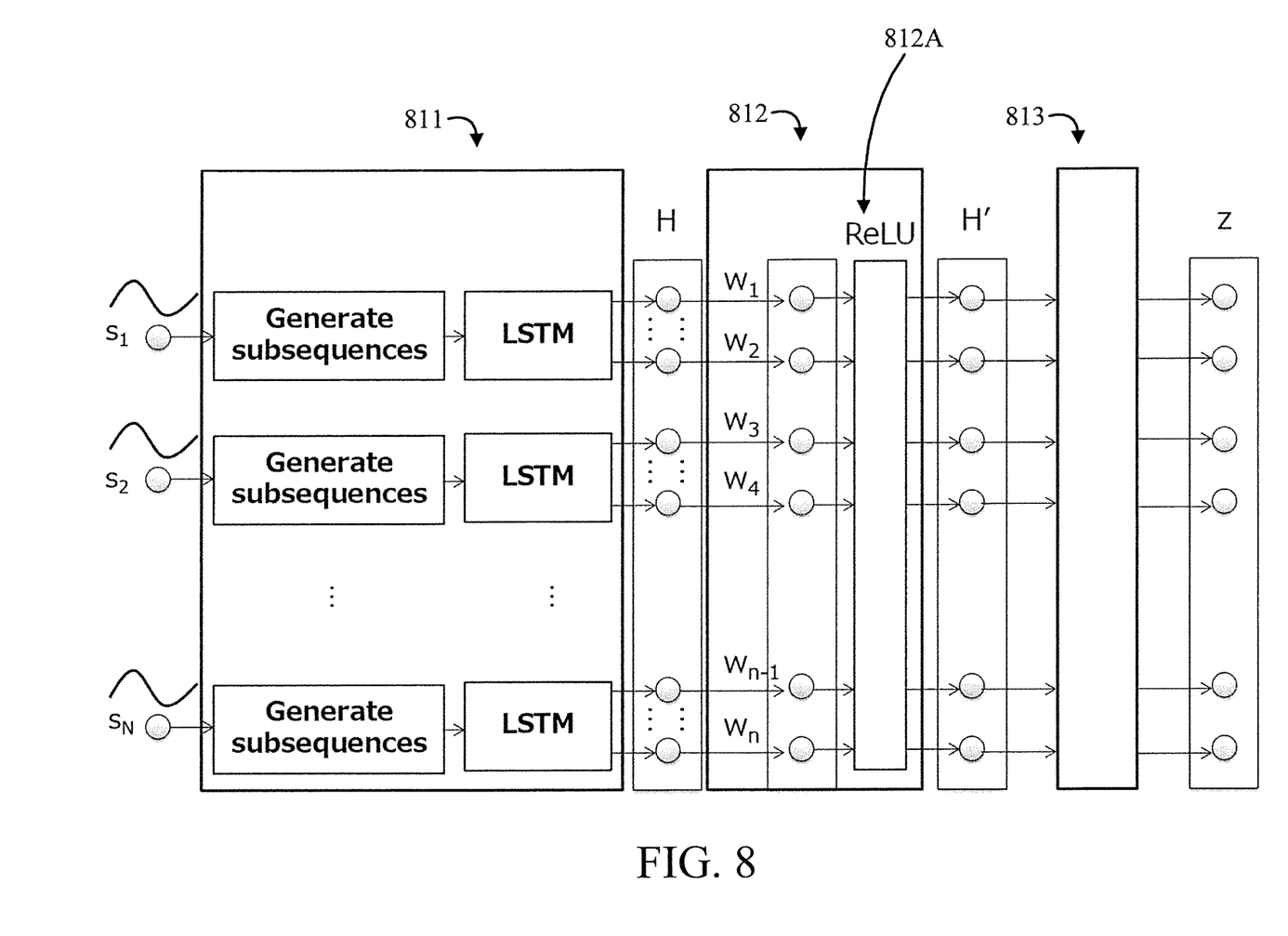
FIG. 8 is a block diagram showing an exemplary signature generator with a ReLU function, in accordance with an embodiment of the present invention.

The feature selector 512 may apply a ReLU function to the feature vectors after multiply by $w_i$ as shown in FIG. 8. In particular, FIG. 8 is a block diagram showing an exemplary signature generator 810 with a ReLU function 812A, in accordance with an embodiment of the present invention.

In an embodiment, in order to verify the model in the signature generator 810, it may provide importance of the attributes to users.

In an embodiment, the detectors 420 may be a classifier. In an embodiment, the multiple detectors 420 may be prepared for each kind of failure.

In an embodiment, the feature extractor 811 may apply some signal processing instead of LSTM to get a feature vector in the feature extractor 811. In this case, for example, it may include one or more of mean, variance, median, 5% quantile, 95% quantile, power spectral density within certain range of frequencies and coefficient of some parametric model for individual attributes such as Autoregressive coefficient.

In an embodiment, LSTM 511B may be replaced by other Recurrent Neural Networks. In this case, for example, it may be Gated Recurrent Unites.

In an embodiment, multiple signature generators and detectors may be used. For each failure category, a signature generator is trained and a detector is formed. During monitoring, if multiple detectors predict failures, then the failure prediction system 400 may provide all of them or some of them based on value in the distance. In the case where the failure prediction system 400 provides one of them, the failure prediction system 400 selects a failure category with the smallest distance with given time series data for monitoring.

Figure 9:
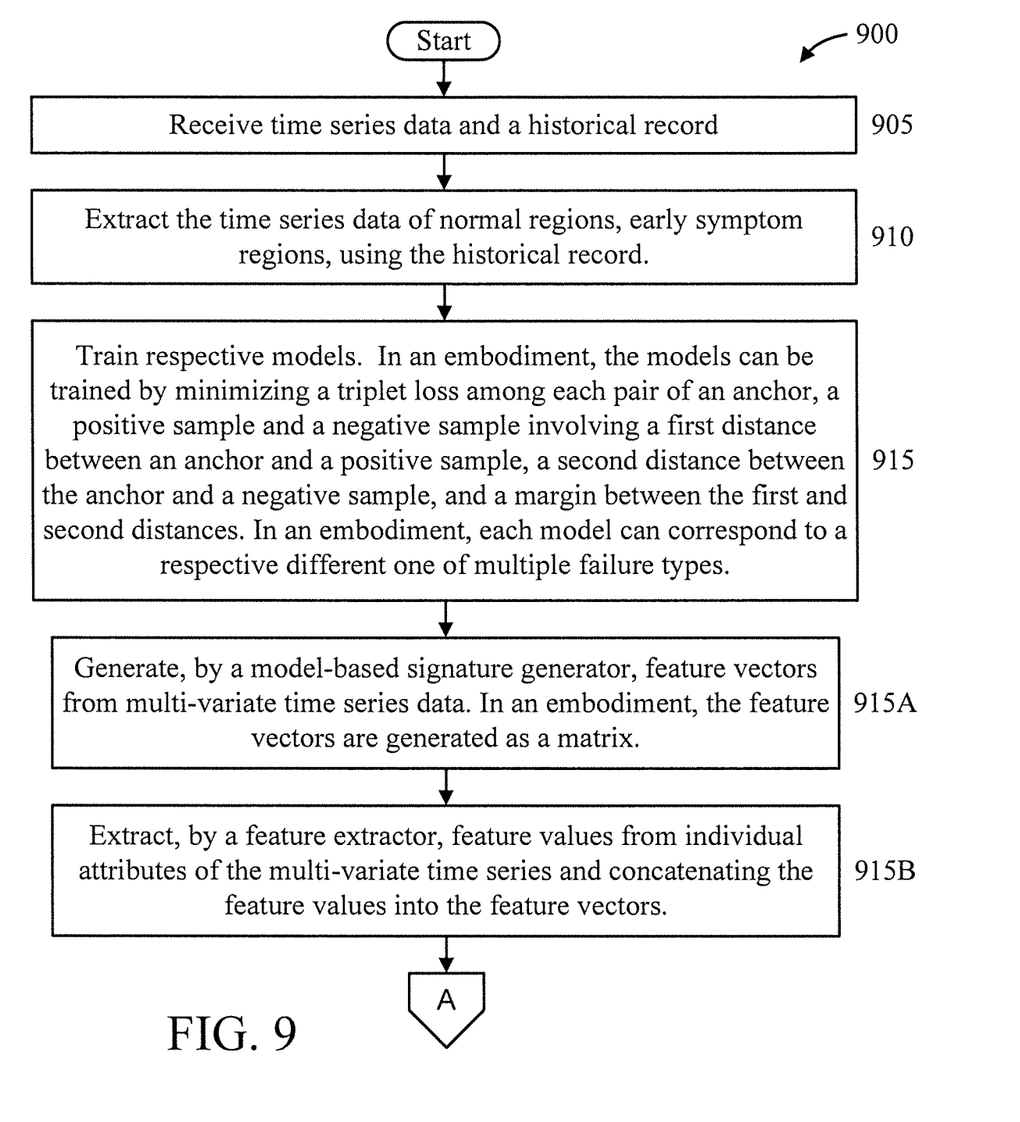
FIGS. 9-10 are flow diagrams showing an exemplary method for failure prediction, in accordance with an embodiment of the present invention.
Figure 10:
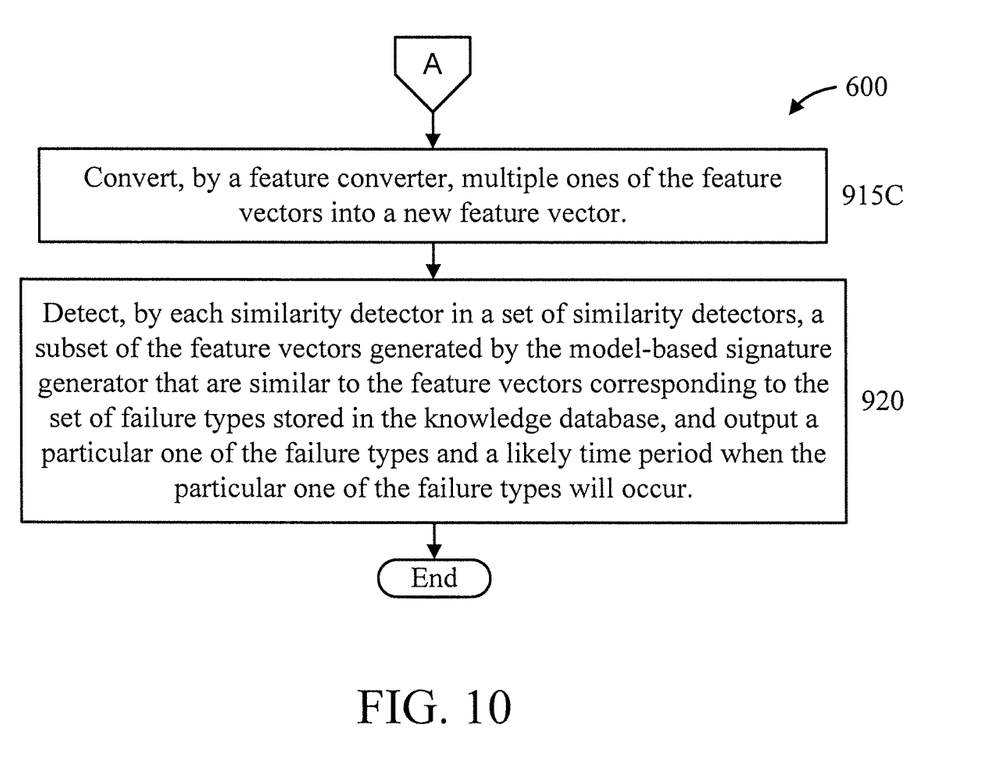

FIGS. 9-10 are flow diagrams showing an exemplary method 900 for failure prediction, in accordance with an embodiment of the present invention.

At block 905, receive time series data and a historical record.

At block 910, extract the time series data of normal regions, early symptom regions, using the historical record. Abnormal regions are not necessary for model training. Moreover, an extraction is performed versus simply dividing, since there may be periods that are not used for model training.

At block 915, train respective models. In an embodiment, the models can be trained by minimizing a triplet loss among each pair of an anchor, a positive sample and a negative sample involving a first distance between an anchor and a positive sample, a second distance between the anchor and a negative sample, and a margin between the first and second distances. In an embodiment, each model can correspond to a respective different one of multiple failure types. The models can be trained to include feature vectors, formed from one or more of the anchor, positive, and negative samples, that are used in a similarity comparison to feature vectors derived from multi-variate time series data from which a failure prediction is to be made as described in further detail below.

At block 915, generate, by a model-based signature generator, feature vectors from input multi-variate time series data from which a failure prediction is to be made. In an embodiment, the feature vectors are generated as a matrix.

In an embodiment, block 915 can include one or more of blocks 915A-915C.

At block 915A, extract, by a feature extractor, feature values from individual attributes of the multi-variate time series and concatenating the feature values into the feature vectors.

At block 915B, assign, by a feature selector, weights to each of the feature values of the feature vectors.

At block 915C, convert, by a feature converter, multiple ones of the feature vectors into a new feature vector.

At block 920, detect, by each similarity detector in a set of similarity detectors, a subset of the feature vectors generated by the model-based signature generator that are similar to the feature vectors corresponding to a set of failure types stored in the knowledge database, and output a particular one of the failure types and a likely time period when the particular one of the failure types will occur.

A description will now be given regarding various advantages of the present invention, in accordance with one or more embodiments of the present invention.

As a first advantage, the present invention is based on machine learning. This is more general and easier to apply than rule-based methods.

As another advantage, the present invention uses relevant information of the system, namely time series of sensors, as well as history of failures. This approach enables to find signature of failures even if the number of occurrence of the failure is limited.

As yet another advantage, the feature converter gives weights to subsequences in an early symptom region. That enhances signal from important subsequences. It does not assume that the important subsequences are next to the abnormal period. As a result, it works well even if the early symptom region contains many normal subsequences and it is under complex scenario.

As still another advantage, the feature selector gives a weight to each attribute. That enhances signal from important attributes. As a result, it works well even if many irrelevant attributes are included in the multi-variate time series.

As a further advantage, the present invention gives high interpretability of the results since it provides the importance of subsequences and also the importance of the attributes.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A failure prediction system, comprising:
    a model-based signature generator generating feature vectors from individual attributes of multi-variate time series data based on sequence importance and attribute importance;
    a knowledge database storing feature vectors corresponding to a set of different failure types; and
    a set of detectors, each detecting any of the feature vectors generated by the model-based signature generator that are similar to any of the feature vectors corresponding to a respective one of the different failure types stored in the knowledge database based on a similarity threshold and outputting the respective one of the different failure types and a likely time period when the respective one of the different failure types will occur,
    wherein the model-based signature generator generates the feature vectors by:
        extracting, by a feature extractor, feature values from the individual attributes of the multi-variate time series data and concatenating the feature values into the feature vectors;
        assigning, by a feature selector, weights to each of the feature vectors;
        converting, by a feature converter, multiple weighted ones of the feature vectors into a new feature vector; and
        jointly training the feature extractor, the feature selector, and the feature converter.

2. The failure prediction system of claim 1, wherein the model-based signature generator generates the feature vectors as a matrix.

3. The failure prediction system of claim 1, wherein the feature extractor comprises a set of Recurrent Neural Networks.

4. The failure prediction system of claim 1, wherein the feature vectors corresponding to the set of different failure types form a historical failure record of a target system sourcing the multi-variate time series data.

5. The failure prediction system of claim 1, wherein the feature vectors corresponding to the set of different failure types are used to form a prediction model.

6. The failure prediction system of claim 5, wherein the prediction model is trained by minimizing a triplet loss involving a first distance between an anchor and a positive sample, a second distance between the anchor and a negative sample, and a margin between the first and second distances.

7. The failure prediction system of claim 1, wherein the multi-variate time series data is divided into a set of different regions, the set of different regions comprising normal regions and early symptom regions.

8. A computer-implemented method for failure prediction, comprising:
    generating, by a model-based signature generator, feature vectors from multi-variate time series data based on sequence importance and attribute importance;
    storing, by a knowledge database, feature vectors corresponding to a set of different failure types; and
    detecting, by each of detectors in a set, any of the feature vectors generated by the model-based signature generator that are similar to any of the feature vectors corresponding to the set of different failure types stored in the knowledge database based on a similarity threshold and outputting the respective one of the different failure types and a likely time period when the respective one of the different failure types will occur,
    wherein said generating step comprises:
        extracting, by a feature extractor, feature values from the individual attributes of the multi-variate time series data and concatenating the feature values into the feature vectors;
        assigning, by a feature selector, weights to each of the feature vectors; and
        converting, by a feature converter, multiple weighted ones of the feature vectors into a new feature vector,
        wherein the method further comprises jointly training the feature extractor, the feature selector, and the feature converter.

9. The computer-implemented method of claim 8, wherein the feature vectors are generated by the model-based signature generator as a matrix.

10. The computer-implemented method of claim 8, wherein the feature extractor comprises a set of Recurrent Neural Networks.

11. The computer-implemented method of claim 8, wherein the feature vectors corresponding to the set of different failure types form a historical failure record of a target system sourcing the multi-variate time series data.

12. The computer-implemented method of claim 8, further comprising forming a prediction model using the feature vectors corresponding to the set of different failure types.

13. The computer-implemented method of claim 12, wherein the prediction model is trained by minimizing a triplet loss involving a first distance between an anchor and a positive sample, a second distance between the anchor and a negative sample, and a margin between the first and second distances.

14. A computer program product for failure prediction, the computer program product comprising a non-transitory computer readable storage medium having program instructions embodied therewith, the program instructions executable by a computer to cause the computer to perform a method comprising:
    generating, by a model-based signature generator of the computer, feature vectors from multi-variate time series data based on sequence importance and attribute importance;
    storing, by a knowledge database of the computer, feature vectors corresponding to a set of different failure types; and detecting, by each of detectors of the computer, any of the feature vectors generated by the model-based signature generator that are similar to any of the feature vectors corresponding to the set of different failure types stored in the knowledge database based on a similarity threshold and outputting the respective one of the different failure types and a likely time period when the respective one of the different failure types will occur, wherein said generating step comprises:

extracting, by a feature extractor, feature values from the individual attributes of the multi-variate time series data and concatenating the feature values into the feature vectors;

assigning, by a feature selector, weights to each of the feature vectors; and converting, by a feature converter, multiple weighted ones of the feature vectors into a new feature vector, wherein the method further comprises jointly training the feature extractor, the feature selector, and the feature converter.

15. The computer program product of claim 14, wherein the feature vectors are generated by the model-based signature generator as a matrix.

* * * * *